Apr. 3, 1923.
R. C. STARBARD
1,450,873
BRAKE FOR BABY CARRIAGES
Filed Mar. 11, 1922
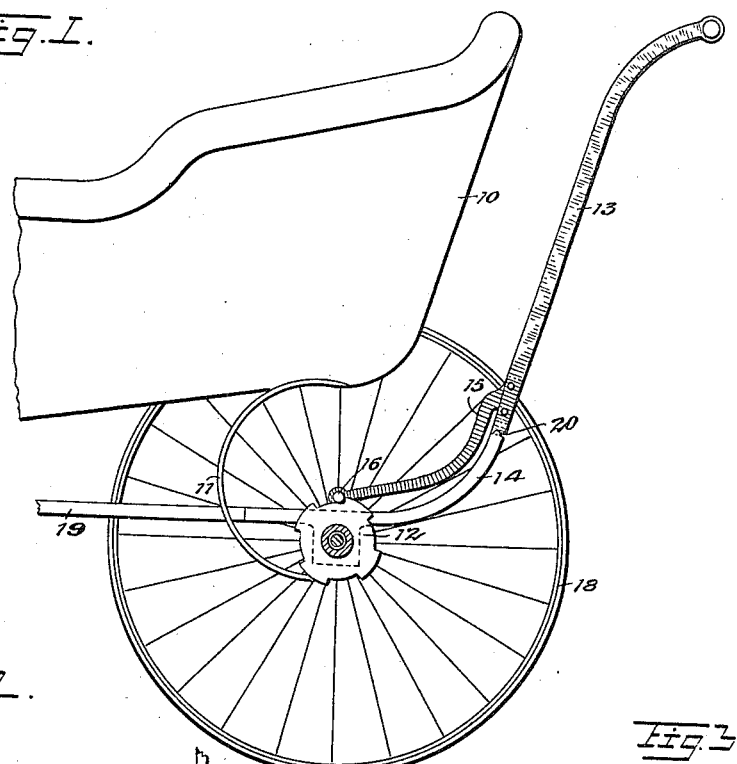
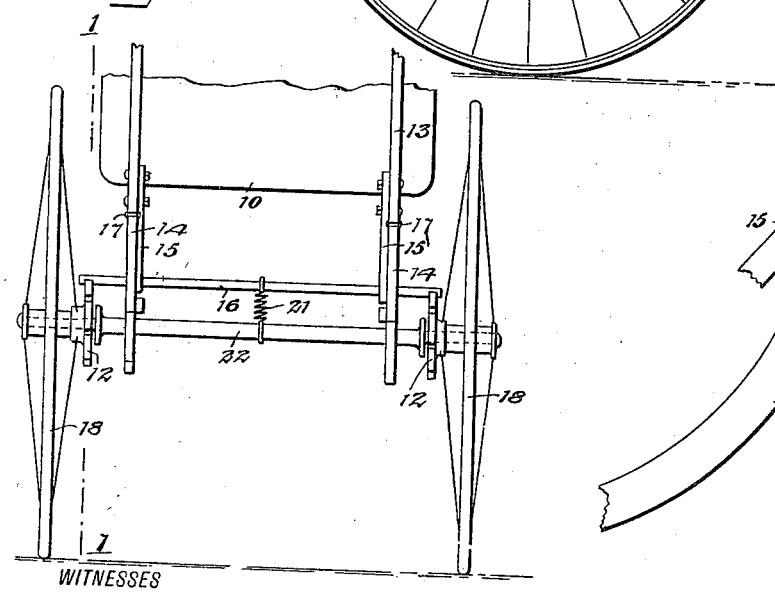
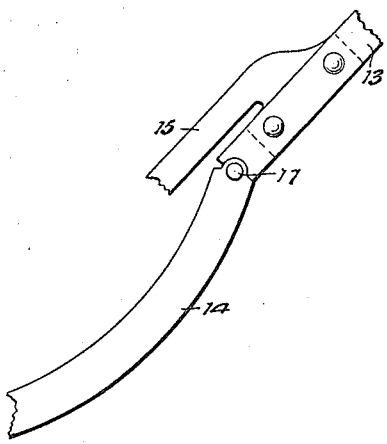
WITNESSES
H. J. Walker
E. W. Savage
INVENTOR
Raymond C. Starbard
BY Munn & Co.
ATTORNEYS Patented Apr. 3, 1923.

1,450,873

UNITED STATES PATENT OFFICE.

RAYMOND C. STARBARD, OF PATERSON, NEW JERSEY.

BRAKE FOR BABY CARRIAGES.

Application filed March 11, 1922. Serial No. 542,982.

*To all whom it may concern:*

Be it known that I, RAYMOND C. STARBARD, a citizen of the United States, and a resident of Paterson, in the county of Passaic and State of New Jersey, have invented new and useful Improvements in Brakes for Baby Carriages, of which the following is a full, clear, and exact description.

This invention relates to brakes primarily designed for use with baby carriages, and is an improvement over the device disclosed in my Patent No. 784,443, granted March 7, 1905.

The general object of the invention is the provision of a cheap, simple and efficient brake that is normally held in operative position when the carriage is not in operation and capable of being moved out of operative position when a downward force is applied to the handle to move the carriage.

A further object is the provision of a brake for use with baby carriages or the like which acts immediately upon the release of the baby carriage handle to stop the movement of the baby carriage.

These objects are accomplished by providing a fulcrum upon which the baby carriage handle is mounted, and supplying, in conjunction with the handle, means for engaging notched disks attached to the baby carriage wheels to hold them against rotation, and providing, in conjunction with the disk engaging means, means for drawing the same into engagement with the disks when the handle is released.

These and other objects of the invention will be more clearly understood from the following detailed description and accompanying drawings, in which—

Figure 1 is a section along the line 1—1, Figure 2;

Figure 2 is a rear elevation of a portion of the baby carriage with the braking means applied; and Figure 3 is a detail plan view showing the handle mounted on the fulcrum.

Referring to the above-mentioned drawings, the baby carriage body 10 is mounted on springs 11 carried by the axle 22. The reach 19 of the baby carriage is also carried by the axle 22. Attached to the reach 19 are two curved supports 14, the upper ends of which form a fulcrum for the baby carriage handle 13. The handle 13 is fulcrumed at 20 and has attached thereto two arms 15 which extend forward above the supports 14. The handle is retained in position on the supports 14 by means of the bolts 17 which connect the supports and the handle. Carried by the free ends of the arms 15 is a bar 16, which serves to engage notched disks 12. These notched disks 12 are attached to the wheels 18 of the carriage, which are rotatably mounted on the axle 22. A spring 21 is connected between the axle 22 and the rod 16 and serves to draw the rod 16 into engagement with the disks 12 when the handle 13 is released.

The operation of this device is as follows:

Normally the bar 16 is retained in engagement with the notched disks 12 since the strength of the spring 21 is greater than the moment about the fulcrum point 20, caused by the weight of the handle 12. This holds the wheels 18 from rotating and the carriage remains stationary. When it is desired to set the carriage in operation, a force is applied to the handle 13, pressing it downward, rotating it about the fulcrum points 20, thus raising the bar 16 out of engagement with the notched disks 12. The carriage may then be pushed along, causing the wheels 18 to rotate. Whenever the handle is released it is rotated about its fulcrum points 20 by the spring 21 and further movement of the carriage is prevented.

From the above it will be seen that the inventor has provided a brake construction for baby carriages which consists of few parts.

The operation of this device is simple and positive. When the carriage is released on a slope or the like there is no danger of it getting away from the operator because the brakes would immediately act and hold the carriage from further movement.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In combination with a baby carriage including a rear axle having wheels rotatably mounted thereon, a braking device comprising notched disks attached to the wheels, means supported on the axle upon which the handle is fulcrumed, means associated with the handle for engaging the notched disks and adapted to be removed from engagement with said disks when the handle is pressed downward, and means for normally retaining the disk engaging means in engagement with the disks when the handle is released.

2. In combination with a baby carriage including a rear axle having wheels rotatably mounted thereon and a handle, a braking device of the class described comprising a plurality of notched disks fixed to the wheels, means supported on the axle upon which the handle is fulcrumed, arms fixed to the handle and adapted to swing about the fulcrum point, and a bar carried by the arms and normally held in engagement with the notched disks to prevent the rotation of the wheels and adapted to be rotated upward about the fulcrum points when the handle is pushed downward thus releasing the notched disks.

3. In combination with a baby carriage including an axle having wheels rotatably mounted thereon and a handle, a braking device of the class described comprising supports carried by the axle to form a fulcrum upon which the handle is fulcrumed, and arms attached to the handle, a bar carried by said arms and operated by the rocking of the handle about its fulcrum, and means attached to the wheels capable of being engaged by said rod to hold the wheels against rotation.

4. In combination with a baby carriage including a rear axle having wheels rotatably mounted thereon and a handle, a braking device of the class described comprising notched disk means attached to the wheels, supports carried by the axle for forming a fulcrum upon which the handle is fulcrumed, arms attached to the handle and extending forward, disk engaging means carried by the arms and capable of being moved into engagement and out of engagement with the disk means as the handle is rocked about its fulcrum point, and spring means interposed between said disk engaging means and the axle for normally holding the disk engaging means in engagement with said disk means to hold the wheels against rotation.

RAYMOND C. STARBARD.